United States Patent [19]

Gollan

[11] Patent Number: 4,681,605
[45] Date of Patent: Jul. 21, 1987

[54] ANISOTROPIC MEMBRANES FOR GAS SEPARATION

[75] Inventor: Arye Z. Gollan, Newton, Mass.

[73] Assignee: A/G Technology Corporation, Needham, Mass.

[21] Appl. No.: 749,574

[22] Filed: Jun. 27, 1985

[51] Int. Cl.⁴ .............................................. B01D 53/22
[52] U.S. Cl. .......................................... 55/158; 55/16; 264/48; 264/DIG. 14; 210/500.28
[58] Field of Search ................. 55/16, 158; 210/500.2, 210/500.28, 500.29

[56] References Cited

U.S. PATENT DOCUMENTS

| 1,421,341 | 6/1922 | Zsigmondy | 210/500.29 |
| 1,720,670 | 7/1929 | Duclaux | 210/500.29 X |
| 2,947,687 | 8/1960 | Lee | 210/640 X |
| 2,953,502 | 9/1960 | Binning et al. | 210/500.29 X |
| 2,960,462 | 11/1960 | Lee et al. | 210/500.29 X |
| 3,133,132 | 5/1964 | Loeb et al. | 210/500.2 X |
| 3,342,729 | 9/1967 | Strand | 210/500.29 X |
| 3,412,184 | 11/1968 | Sharples et al. | 210/500.2 X |
| 3,415,038 | 12/1968 | Merten et al. | 55/16 |
| 3,423,491 | 1/1969 | McLain et al. | 210/500.2 X |
| 3,522,335 | 7/1970 | Rowley | 210/500.2 X |
| 3,648,845 | 3/1972 | Riley | 210/500.29 X |
| 3,666,508 | 5/1972 | Justice et al. | 210/500.2 X |
| 3,709,774 | 1/1973 | Kimura | 210/500.2 X |
| 3,789,993 | 2/1974 | Brown et al. | 210/500.2 |
| 3,792,135 | 2/1974 | Brown et al. | 210/500.2 X |
| 3,852,388 | 12/1974 | Kimura | 55/16 X |
| 3,864,289 | 2/1975 | Rendall | 210/500.29 X |
| 4,008,047 | 2/1977 | Petersen | 210/500.29 X |
| 4,035,459 | 7/1977 | Kesting | 210/500.2 X |
| 4,086,310 | 4/1978 | Bottenbruch et al. | 55/158 X |
| 4,127,625 | 11/1978 | Arisaka et al. | 210/500.29 X |
| 4,192,842 | 3/1980 | Kimura et al. | 55/158 X |
| 4,214,020 | 7/1980 | Ward et al. | 210/500.2 X |
| 4,230,463 | 10/1980 | Henis et al. | 55/73 X |
| 4,323,627 | 4/1982 | Joh | 210/500.29 X |
| 4,371,487 | 2/1983 | Hamada et al. | 210/500.2 X |

Primary Examiner—Robert Spitzer
Attorney, Agent, or Firm—Charles Hieken

[57] ABSTRACT

A gas separation membrane has a dense separating layer about 10,000 Angstroms or less thick and a porous support layer 10 to 400 microns thick that is an integral unit with gradually and continuously decreasing pore size from the base of the support layer to the surface of the thin separating layer and is made from a casting solution comprising ethyl cellulose and ethyl cellulose-based blends, typically greater than 47.5 ethoxyl content ethyl cellulose blended with compatible second polymers, such as nitrocellulose. The polymer content of the casting solution is from about 10% to about 35% by weight of the total solution with up to about 50% of this polymer weight a compatible second polymer to the ethyl cellulose in a volatile solvent such as isopropanol, methylacetate, methanol, ethanol, and acetone. Typical nonsolvents for the casting solutions include water and formamide. The casting solution is cast in air from about zero to 10 seconds to allow the volatile solvent to evaporate and then quenched in a coagulation bath, typically water, at a temperature of 7°–25° C. and then air dried at ambient temperature, typically 10°–30° C.

27 Claims, 2 Drawing Figures

ANISOTROPIC MEMBRANES FOR GAS SEPARATION

This invention was made with Government support under Contract No. DE-AC07-83ID12429 awarded by the Department of Energy. The Government has certain rights in this invention.

This invention relates in general to membranes for separating at least one gas from gaseous mixtures and to processes for selectively separating at least one gas from gaseous mixtures and more particularly concerns novel anisotropic membranes characterized by exceptional separation characteristics in compact size that may be fabricated relatively easily and inexpensively.

Gas separation membranes exhibit different transport rates of one or more gases than that of at least one other gas of the mixture, thus effecting a preferential depletion or concentration of one or more desired gases in the mixture. Gas separation membranes must provide an adequately selective separation of one or more desired gases at sufficiently high flux, that is, permeation rate of the permeate gas per unit surface area, if the membranes are to be of commercial interest.

Gas separation membranes which exhibit a high flux but low selectivity separation are not desirable in some cases as they may be unable to provide the required separation at economical operating conditions. Gas separation membranes which exhibit adequate selectively but undesirable flux rates are also unattractive in some cases as they require large, uneconomical separating membrane surface areas.

The field of liquid separation membranes provides many analogous aspects for gas separation via membranes. Liquid separation membranes developed for reverse osmosis applications (e.g., sea water desalination) were first produced as "dense" or "compact" membranes wherein the membranes are essentially free of pores. A dense membrane is of constant composition with essentially uniform intermolecular void openings throughout its thickness and may be termed symmetric or isotropic. The main disadvantage of dense membranes in both liquid and gas separations is their relatively large thickness, typically over 5 microns, which results in low permeate flux. That is, the entire thickness of the membrane acts as a separation barrier with gas permeability limited by the membrane thickness.

A search of subclasses 16, 158 and 421 of class 55, subclasses 490, 500.2 and 510.1 of class 210 and subclasses 41, 48, 49, 177F, 178F, 194, 217, 331.18, 331.21 and 344 of class 264 uncovered U.S. Pat. Nos. 2,935,371, 2,955,017, 3,180,845, 3,242,120, 3,318,990, 3,340,340, 3,414,645, 3,674,628, 3,716,614, 3,762,136, 3,944,485, 3,957,651, 4,029,582, 4,029,726, 4,035,459, 4,045,352, 4,100,238, 4,145,295, 4,187,333, 4,192,842, 4,219,517, 4,230,463, 4,234,431, 4,238,571, 4,247,498, 4,268,278, 4,279,846, 4,286,015, 4,302,334, 4,307,135, 4,371,487, 4,385,084, 4,385,094, 4,414,168, 4,439,322, 4,459,210, and 4,472,175. What are believed to be the most pertinent patents are discussed below.

Improved membrane performance was achieved in reverse osmosis membranes through the efforts of Loeb et al. (U.S. Pat. No. 3,133,132) wherein membranes with a thin, dense semipermeable skin and a less dense, void-containing, nonselective support region were cast. These "Loeb-type" membranes may be termed asymmetric or anisotropic due to the distinct pore size gradation throughout the membrane structure. Gas transport in anisotropic membranes is by bulk flow through the porous substructure and by solution-diffusion through the thin dense skin. The thin dense skin, therefore, provides the gas separating barrier while the substructure provides a support to the thin dense skin, adds strength and allows ease of handling.

"Loeb-type" membranes have principally been produced from cellulose acetate. Such membranes are subject to compaction of the support region (effectively increasing the thickness of the dense layer and reducing the permeation rate), fouling and chemical attack. Due to these inherent disadvantages of cellulose acetate, significant research has been directed at producing "Loeb-type", anisotropic membranes of other materials. As noted in U.S. Pat. No. 4,230,463, "the 'Loebing' of polymer materials to obtain a single component membrane exhibiting good selectivity and a good permeation rate has been found to be extremely difficult." Furthermore, it states that, "it is even more difficult to provide 'Loeb-type' membranes which exhibit good selectivity and permeation rates for gas separation operations".

To overcome the difficulties associated with formation of integral anisotropic membranes with thick, dense separating skin layers, a class of membranes termed "composite membranes" has evolved. As originally conceived, composite membranes are of multicomponents wherein a highly porous, anisotropic or uniform substructure of one material is used as a support for a thin dense coating of a second material. The support structure provides essentially no separation, with the dense coating being the controlling layer. For gas separation membranes the dense coating material is specifically selected for its gas selectivity and is applied in thicknesses of about 5,000 Angstroms. Defects in the separating layer may require the application of multiple coatings, thus increasing thickness and reducing the permeation rate. In addition, the coating may be fragile, making the entire composite membrane difficult to handle.

A second type of composite membrane is disclosed in U.S. Pat. No. 4,230,463, wherein the separation properties of the multicomponent membrane are principally determined by the porous support membrane as opposed to the material of the coating. A dense or anisotropic membrane of a material which performs the major gas separation is coated with a second material to cover or reduce pore openings (i.e., imperfections) in the base membrane. The resultant membrane has a higher gas selectivity, but lower permeability, than either the porous separation membrane or the coating material.

Composite gas membranes with porous supports and thin coatings which provide the separation are exemplified in U.S. Pat. Nos. 3,616,607, 3,657,113 and 3,775,303. Composite gas membranes with support structures which provide the bulk of the gas separation are exemplified by U.S. Pat. No. 4,230,463. Such composite membranes require at least a two-step casting procedure wherein the support structure is prepared first, and the coating material is subsequently applied. In some cases, elaborate techniques are required to reduce small particulate impurities in the manufacturing area which can puncture the fragile thin separating layer coatings of some composite membranes.

It has been deemed necessary by some researchers to resort to these elaborate, multiple step membrane manufacturing processes since, as stated in U.S. Pat. No. 4,230,463, "apparently suitable anisotropic membranes have not been provided for gas separations, which in the absence of a superimposed membrane (i.e. coating) to provide the selective separation, exhibit sufficient flux and selectivity of separation for general commercial operation." Col. 6, lines 11–16. This statement is reinforced by the data provided in U.S. Pat. No. 3,709,774 wherein anisotropic membranes for gas separations were prepared with relatively thick separating layer skins on the order of 27,000 Angstroms (2.7 microns). Such membranes provide too low a gas permeability to be commercially viable, even though prepared in a single step.

Prior art membranes comprised of ethyl cellulose have been prepared in two reported instances. In one case, as described in the GSRI Final Report for OWRT Contract No. 14-34-001-0523, U.S. Dept. of the Interior, May 13, 1982, anisotropic reverse osmosis membranes were fabricated, however these membranes are not known to offer either the separation or the significantly thin separating layer (skin) necessary for high gas permeability and commercial viability. Furthermore, these membranes were prepared for liquid separations and, as discussed above and elsewhere, such membranes are not necessarily suitable for gas separations. Additionally, the ethyl cellulose grades employed were the more hydrophilic, low ethoxyl grades.

September 1984 Japanese Patent Publications Nos. 59,166,208 [84,166,208], 59,169,509 [84,169,509] and 59,169,510 [84,169,510] describe processes for making hollow fiber membranes from ethylcellulose. These publications disclose anisotropic and composite membranes comprised of ethyl cellulose produced in a multi-step procedure with solvents specifically selected to have high boiling points (e.g., N-methyl pyrolidone, Dimethyl formamide). The membranes are then cast at high temperatures, in the order of 100° to 120° C., into several gelation/treatment baths in series. The resulting membranes exhibited the following range of oxygen permeability and oxygen/nitrogen separation factors from air:

| Membrane Number | Oxygen Permeability $cm^3(STP)/cm^2$ sec cm-Hg | Oxygen/Nitrogen Separation Factor |
|---|---|---|
| Anisotropic 1 | 1.4 × 10E-4 | 2.8 |
| Anisotropic 2 | 0.77 × 10E-4 | 3.1 |
| Composite 1 | 3.7 × 10E-6 | 3.7 |

These membranes were cast from high boiling point solvents at elevated temperatures and in several steps. For example, the membrane designated Anisotropic 1, above was cast from a solution of 210 parts ethyl cellulose in 350 parts N-methyl pyrolidone and 140 parts ethylene glycol at 120° C., was spun into air to form a hollow fiber at 100° C., coagulated in 3:7 N-methyl pyrolidone:water mixture at 50° C., treated with 50° C. water for 50 seconds, immersed in 1:1 ethanol:water mixture for 0.5 seconds and air dried at 52° C. A similar membrane, without the 0.5 second exposure to the ethanol:water mixture had essentially no selectivity for oxygen over nitrogen (separation factor=1.1).

Liquid separation membrane techniques provide some basis for development of gas separation membranes, however, several critical and different considerations must be taken into account in developing a suitable separation membrane for gaseous systems. Of primary note is the fact that the presence of small pores (imperfections) in the membrane may not unduly adversely affect the performance of a liquid separation membrane due to adsorption on and swelling of the membrane and the high viscosity and high cohesive properties of liquids. On the other hand, since gases have generally low adsorption, viscosity and cohesive properties, small pores in the separating layer provide no barrier for prevention of gas passage. Hence, such a membrane provides little, if any, selective separation due to the large ratio of hydraulic mass flow through the small pores (imperfections) to the flow of gas through the membrane. Gas separation membranes, unlike reverse osmosis membranes, must therefore be produced defect-free or the ability to repair (or plug) defects with a coating material is required. The severity of the small pore (imperfection) problem increases, the higher the selectivity of the membrane. However, a membrane acceptable for gas separation is free from defects and is thus inherently also acceptable for solute separation in liquids provided it has acceptable transport properties for the liquid.

Small pores, or imperfections, in the separating layer require a coating, as described above. Such imperfections should not be confused with a loosely packed aggregation of polymer molecules in the separating layer, since this aggregation can be tightened, for example, by a simple post treatment heating (annealing) step to provide a membrane with useful gas selectivity. Such an operation is commonly done with the Loeb-type reverse osmosis membranes.

Another difference between liquids and gases which might affect the selective separation by permeation through membranes is the generally lower solubility of gases in membranes as compared to the solubility of liquids in such membranes. This factor results in lower permeability constants for gases as compared to those for liquids. Due to this lower permeability of gases, efforts have been directed to providing the gas membrane separating layer in as thin a form as possible to increase permeability, yet in as pore-free a layer as possible to maintain selectivity.

Also unlike reverse osmosis membranes which are generally cast from hydrophilic polymers to improve wetting by the liquid feed stream, gas separation membranes are not necessarily formed from such polymers.

It is an important object of this invention to provide improved anisotropic membranes and methods of their manufacture.

It is an object of this invention to provide polymeric membranes for separation of one or more gases from at least one other gas of a gas mixture with the membrane comprising ethyl cellulose or ethyl cellulose admixed with compatible second polymers and being capable of being formed with thin, defect-free separating layers.

Another object of this invention is to provide anisotropic membranes in accordance with the preceding object which exhibit good oxygen/nitrogen separation factors and can be formed in a single-step, cost-effective casting procedure with conventional casting techniques and equipment.

It is a feature of the preceding object that the membranes can be formed using substantially conventional techniques for casting flat film membranes and spinning hollow fiber membranes using conventional equipment.

It is a further feature of the preceding objects that the hollow fiber membranes so formed have burst good fiber strength and can be configured in economic cartridge and other modes.

Still another object of this invention is to provide composite membrane coatings in accordance with the preceding objects which in themselves are either anisotropic or dense thin layers and which affect the gas separation.

Still another object of this invention is to provide a method for separating one or more gases from at least one other gas in a gas mixture by selective permeation to provide a permeated product containing at least one permeating gas.

A further feature of the preceding object is to provide methods of separating oxygen from nitrogen to enable commercially useful concentrations of oxygen (about 22% to about 40%) and/or concentrations of nitrogen (about 88% to about 99%) to be obtained in a single stage, relatively simplified system for a variety of uses.

It is a feature of this invention that the method can be used for other than oxygen/nitrogen separation although particular commercial use is envisioned in oxygen/nitrogen separation area.

According to the invention, an anisotropic gas separating membrane free of imperfections is made of a film former polymer cast from solvents including at least one volatile solvent in a single step. More particularly, ansiotropic membranes of this invention are comprised of ethyl cellulose and ethyl cellulose-based blends with compatible second polymers and are cast from solvent systems containing at least one highly volatile solvent (boiling point less than about 100° C. at ambient pressure) in a single, cost-effective step.

According to the invention a membrane for separation of one or more gases from at lest one other gas in a gas mixture is provided and is preferably anisotropic. In a specific form the membrane is formed of polymeric material selected from the group consisting of ethyl cellulose and mixtures of ethyl cellulose with a compatible second polymer such as nitrocellulose. In all cases, the ethyl cellulose forms the major portion of the membrane with the other polymeric materials, such as nitrocellulose, in minor amounts of less than about 50% of the total polymer content. The admixed compatible second polymeric materials may provide increased selectivity for gas separation but are primarily used as viscosity modifiers for the casting solutions and/or to provide greater strength to the cast membrane.

The membranes have a thin dense separating layer thickness of less than 10,000 Angstroms and preferably less than 5,000 Angstroms with an oxygen effective permeability typically of at least $0.5 \times 10E\text{-}4$ cm$^3$ (STP)/cm$^2$ sec cm-Hg and preferably at least $1.5 \times 10E\text{-}4$ cm$^3$ (STP)/cm$^2$ sec cm-Hg.

The membranes have an integral thin dense separating layer and generally require no post treatment operation to further densify the separatig layer to enhance gas selectivity.

The membranes may be heat treated as a post-treatment annealing step to further increase membrane selectivity, such step being optional and dependent on the particular casting solution and casting conditions employed.

The above and other features, objects and advantages of the present invention will be better understood from the following specification when read in conjunction with the accompanying drawings in which.

Figure 1:
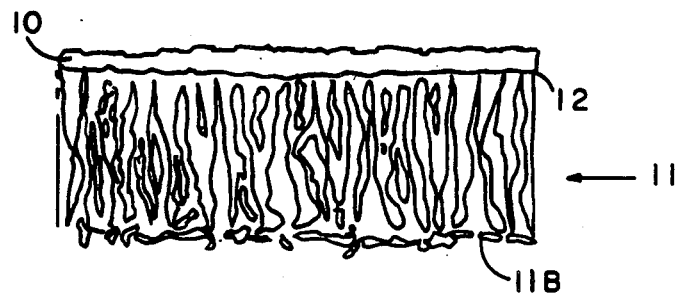
FIG. 1 is a semidiagrammatic showing of an anisotropic membrane structure.

With reference now to the drawing, and more particularly FIG. 1, there is shown an anisotropic membrane structure having a dense film 10 with the thickness of about 10,000 Angstroms or less and a porous support layer 11 of from 10 to 400 microns thick. The anisotropic membrane is an integral unit with gradually and continuously decreasing pore size from the base 11B of the support layer to the surface of the thin separating layer 12 between layers 10 and 11. Layer 11 is itself preferably anisotropic with gradually and continuously decreasing pore size from layer 12 to the outside skin. Support layer or substrate 11 may be an essentially homogeneous layer.

Figure 2:
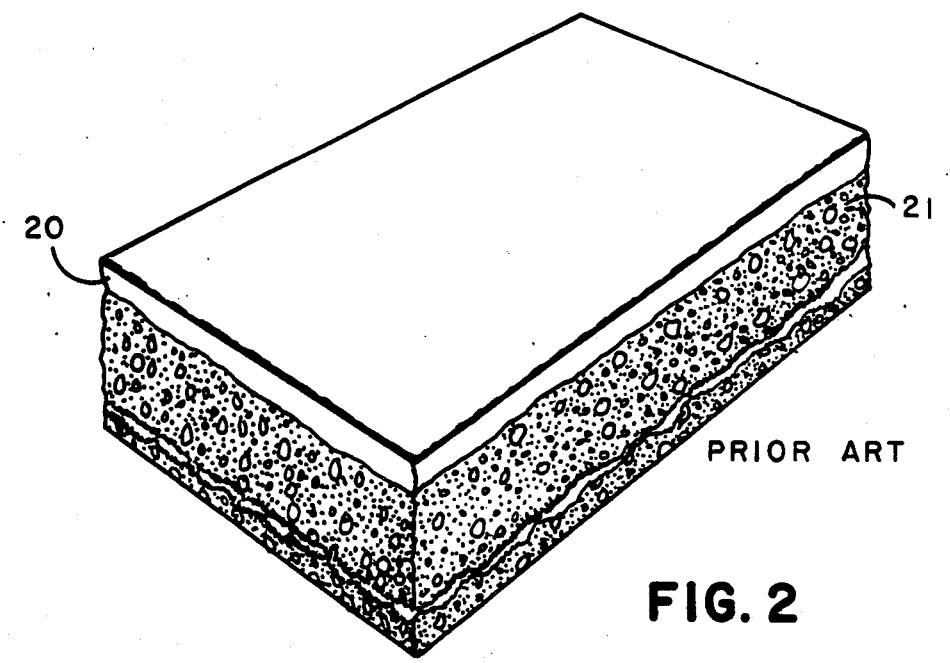
FIG. 2 is a semidiagrammatic showing of a composite membrane structure.

The composite membrane structure as shown in FIG. 2 has a separately applied dense film 20 of thickness of about 10,000 Angstroms or less which affects the separation with a typically anisotropic support layer 21 of typically a different polymer of from 10 to 400 microns thick.

In accordance with this invention, anisotropic membranes for gas separations and composite membrane coatings comprised of ethyl cellulose or ethyl cellulose blends with compatible second polymers exhibit selective permeation for at least one gas of a gaseous mixture. The selectivity of the membrane can be expressed in terms of a separation factor for a pair of gases a and b and may be defined as the ratio of the permeability constant ($P_a$) of the membrane for gas a to the permeability constant ($P_b$) of the membrane for gas b. The separation factor for a given pair of gases a and b may also be defined as the ratio of the effective permeability ($P_a/l$) of a membrane of thickness l for gas a of a gas mixture to the effective permeability of the same membrane to gas b, ($P_b/l$). The units of the membrane effective permeability for a given gas a ($P_a/l$) are expressed as the volume of gas a, at standard temperature and pressure (STP), which passes through a square centimeter of active membrane surface area, per second, for a partial pressure drop of 1 centimeter of mercury across the membrane, that is, $P_a/l = $ cm$^3$(STP)/cm$^2$ sec cm-Hg.

Thus, polymers which have high permeability constants but cannot be made in very thin separating layers would not be attractive as gas separation membranes since the effective permeability of such membranes would be too low to be of commercial value.

Direct measurement of the membrane separating layer thickness is not straightforward nor readily discernible from scanning electron microscopy. Rather, the separating layer thickness is typically back-calculated from the known permeability constant of the base polymer measured from a dense film for a given gas ($P_a$) and the measured effective permeability of the cast membrane for the same gas ($P_a/l$). In the case of ethyl cellulose, the measured oxygen permeability constant (at 25° C., ethoxy 49.5%) per Hsieh, P. T., "Diffusivity and Solubility of Gases in Ethylcellulose", Journal of Applied Polymer Science, Vol. 7, pp. 1743–1756 (1963), is $1.47 \times 10E\text{-}9$ cm$^3$ (STP) cm/cm$^2$ sec cm-Hg. Thus, the separating layer thickness, l, for ethyl cellulose membranes will be approximated by, $$\frac{1.47 \times 10E\text{-}9 \text{ cm}^3 \text{ (STP) cm/cm}^2 \text{ sec cm-Hg}}{\text{The measured membrane O}_2 \text{ effective permeability}}$$

For a membrane separating layer thickness of 10,000 Angstroms or less the measured effective permeability for $O_2$ must equal or exceed $0.147 \times 10E-4$ cm$^3$ (STP)/cm$^2$ sec cm-Hg.

For a membrane separating layer thickness of 1,000 Angstroms or less the measured effective permeability for $O_2$ must equal or exceed $1.47 \times 10E-4$ cm$^3$ (STP)/cm$^2$ sec cm-Hg.

An intrinsic separation factor as referred to herein is the separation factor for a material which has no channels for gas flow across the material, and is the highest achievable separation factor for the material. Such a material may be referred to as being continuous or nonporous and is imperfection free.

Ethyl cellulose has long been known in the art to have good intrinsic gas selectivity (separation factors) for various gas mixtures and has been reported to have oxygen/nitrogen separation factors of between 3.15 and 4.

What has not been known in the art, and what this invention teaches, are methods by which ethyl cellulose and ethyl cellulose blends with compatible second polymers can be cast into anisotropic or composite membranes with thin separating layers for exploitation of commercial gas separation applications. Furthermore, the anisotropic membranes cast by the methods of this invention may be prepared in a single, highly cost-effective step.

The invention described herein is uniquely different from all prior art dense, anisotropic or composite gas membranes whether comprised of ethyl cellulose or other polymers in that the anisotropic membranes of this invention (a) consist of integral, essentially imperfection-free separating skin layers; (b) are cast in a single step, cost-effective procedure using conventional casting techniques; (c) may be prepared without any post treatment steps, although a post treatment annealing step provides a further degree of freedom in achieving specific membrane characteristics; (d) are cast from solvents, at least one of which is specifically selected to have a low boiling point; (e) and in specific form are comprised of ethyl cellulose or ethyl cellulose blends with compatible second polymers wherein the primary ethyl cellulose grade is preferably, but not necessarily, a middle and high ethoxyl grade with an ethoxyl content of above 47.5%.

The invention pertains to particular membranes for gas separations. In a specific form these membranes comprise ethyl cellulose and ethyl cellulose-based blends with compatible second polymers which are cast from carefully selected solvent/nonsolvent systems in a single, cost-effective step. A typical casting technique involves beginning with the selection of a base polymer, such as ethyl cellulose or a predominately ethyl cellulose polymeric material, a solvent system which may consist of a good and/or a poor solvent combination, at least one of which components is volatile and a third portion of a nonsolvent. The good solvent can be of one or more components. Similarly, one or more poorer solvents and/or one or more nonsolvents can be used. A leaching agent is selected which is miscible with the solvents and is a nonsolvent for the polymers used.

From about 10% to about 50% by weight of the nonsolvent is added to a solution of the polymer in the solvent system to form the casting solution. A membrane precursor is then cast from the casting solution using substantially conventional techniques and is exposed to air for a short time, on the order of less than one second to about one minute, to cause sufficient solvent loss to form an integral skin layer and then immersed into a leaching agent. Immersion time in the leaching agent should be long enough for the entire membrane structure to develop; that is, on the order of about one minute or longer. The membrane is typically left in a water bath to complete extraction of trace solvents and nonsolvents for up to a few hours. The membrane is then dried in air at ambient room temperature (about 10° to 35° C.).

In some cases, the membrane can be heat treated (annealed) to further improve selectivity for gas permeation.

The ethyl cellulose structure is as shown on page 2 of Form No. 192-818-881, "Ethocel Ethylcellulose Resins", The Dow Chemical Company, Midland, MI 1981.

Each anhydroglucose unit in the cellulose precursor has three reactive hydroxyl sites. Customarily the ethyl cellulose is formed by treating the cellulose polymer with an alkaline solution to produce alkali cellulose which is subsequently reacted with ethyl chloride to yield ethyl cellulose. The degree of substitution can be 3 if all of the hydroxyl groups are substituted during this reaction. However, the reaction can proceed with half of the hydroxyl groups substituted with three ethoxyl groups and the other half substituted with two ethoxyl groups (leaving one unsubstituted hydroxyl group on every other anhydroglucose unit). The resultant ethyl cellulose would thus have a degree of substitution of 2.5.

In a preferred embodiment of this invention the ethyl cellulose contains about 2.2 or more ethoxyl groups per anhydroglucose unit, corresponding to an ethoxyl content of over 45%. Such products are available from the Dow Chemical Corporation of Midland, Mich., under the trademark ETHOCEL and from Hercules, Incorporated of Wilmington, Del. Still other useful ethyl cellulose products could be prepared through polymer modifications and may consist of a specific narrower ethoxyl content range, if found advantageous.

Solvents useful in this invention vary dependent upon the ethoxyl content of the ethyl cellulose with one solvent being a good primary solvent for one grade, yet a poorer solvent for another grade. Ideally, the solvents selected will be water soluble to simplify the casting operation.

In selecting the solvent system it is of primary importance to select at least one solvent which has a relatively high volatility (low boiling point) to cause a rapid and sufficient solvent loss to form an integral thin separating layer upon air exposure in the casting process.

The one or more volatile solvents have boiling points (at ambient pressure) in the range of about 50° C. to about 100° C., and preferably in the range of about 50° C. to about 85° C. The volatile solvent(s) may be, but need not be, the majority of the solvent component of the casting solution.

Solvents found to be typically good primary solvents for the casting solutions from which the membranes of this invention are formed include, but are not limited to: isopropanol, methyl acetate, methanol, ethanol, dioxane, acetone, N-methyl-2-pyrolidone, and dimethylacetamide. Typical nonsolvents for the casting solutions from which the membranes of this invention are formed include, but are not limited to: water and formamide.

In a typical embodiment of this invention, the polymer content of the casting solution is from about 10% to about 35% by weight of the total solution. Up to about 50% of this polymer weight may be a compatible second polymer to the ethyl cellulose base polymer. Furthermore, the ethyl cellulose component of the casting solution may be a single grade or a blend of multiple grades of ethyl cellulose.

In making thin films or flat sheets of membrane in accordance with this invention a typical casting solution contains about 10% to 35% by weight of polymer and preferably about 14% to 26% by weight of polymer. The examples provided subsequently are based upon laboratory casting techniques using conventional, manually-drawn casting knifes and glass plates which allow for control of air exposure times in the range of 6 or more seconds. The flat casting techniques may be embodied in automated casting equipment wherein air exposure times on the order of a second or less can be maintained. Furthermore, such casting machines can be operated with or without a highly porous "web" support to provide ease of handling the flat cast membrane without contributing to or detracting from the gas selectivity of the membrane.

Due to the inherent difficulty of controlling air exposure time in laboratory flat sheet membrane casting, as described below, the effective permeability of the cast membranes may be less than optimum since solvent evaporation and separating layer densification will occur over a longer time. The casting formulations subsequently shown for flat sheet membranes are, however, adaptable to flat sheet machine casting or hollow fiber spinning wherein the exposure time prior to coagulation bath immersion can be more tightly controlled and somewhat reduced.

In making hollow fiber (or hollow filament) gas separation membranes according to this invention, the spinning may be conducted using essentially conventional spinning apparatus as would be available to and used by one skilled in the art and is conventionally termed the wet/dry spinning technique. A fluid is commonly injected inside the bore of the fiber. Such fluid may comprise, but is not limited to, air, water, a solvent for the primary grade of ethyl cellulose in the polymer mix, or a water/solvent mixture. The outside of the fiber is exposed to an environment, prior to immersion in a coagulating media, which is typically air at about 20% to about 80% relative humidity to induce solvent evaporation and formation of the integral gas separating thin layer. This exposure time may range from essentially zero to about 10 seconds and is preferably about 0.1 to about 5 seconds.

Any essentially nonsolvent for the ethyl cellulose or ethyl cellulose-based blends with compatible second polymers, similar but not limited to the ones incorporated in the casting solution, can be employed as the coagulation bath (i.e., quench media). Conveniently, water is employed as the primary nonsolvent in the coagulation bath. The residence time of the spun fiber in the coagulation bath is at least sufficient to insure solidification of the filament and is on the order of several seconds to a minute, but may be significantly longer without any detrimental effect on the membrane, the membrane performance characteristics or the simplicity of the spinning operation. The temperature of the coagulation bath may vary from about 2° C. to about 35° C. and is preferably in the range of about 7° C. to about 25° C. The coagulated hollow fiber is dried in air at ambient temperature, typically 10° C. to 30° C.

In some instances, depending upon the starting casting formulation, the casting conditions and the desired performance characteristics of the membranes (either flat sheet or hollow fiber), it may be advantageous to heat treat the coagulated membranes to improve their gas selectivity. Such heat treatment (so-called annealing), may reduce the effective permeability of the membrane. The heat treatment step may be performed in air, water, or a water/solvent mixture; at temperatures in the range of about 50° C. to about 130° C., and preferably in the range of about 60° C. to about 100° C.; and, for times in the range of about 1 minute to several hours, and preferably in the range of about 15 minutes to about 60 minutes.

The foregoing descriptions of methods for preparing flat sheet and hollow fiber gas separation membranes are provided to illustrate techniques which are available for producing gas separation membranes and are not in limitation of this invention.

The following specific examples are meant to be non-limiting and illustrative of the invention and set forth in tables on pages which follow:

Casting solutions for forming flat anisotropic membranes comprising ethyl cellulose, multiple grades of ethyl cellulose or ethyl cellulose with nitrocellulose are formed by admixing materials as shown in the following Table A. In Table A, all percentages are by weight of the entire solution. The polymers noted in Table A are further defined in the following Table G. Numbers assigned to casting solutions correspond to numbers assigned to experimental solutions actually prepared. Only numbered solutions from which satisfactory membranes were made are listed in the examples.

At least one of the solvents in each casting solution noted in Table A is a volatile solvent with a boiling point at ambient pressure of less than 100° C. The boiling point for all noted solvents are given in Table H.

As can be observed, the more volatile solvent in the casting solution need not be the most prevalent solvent in the casting solution.

Casting solutions prepared in accordance with Table A are cast into flat membranes by spreading a bead of the casting solution on about an 8-inch × 10-inch glass surface and spreading the bead to form an essentially uniform layer thickness of about 5 to 10 mils over the surface of the glass. The spread film of casting solution is exposed to the air for from about 6 seconds to about 60 seconds and then immersed in a coagulation bath of water at a temperature of about 20° C. to about 30° C. Coagulation is accomplished and the membrane is allowed to remain in the bath for approximately 2 hours. The membrane typically floats off the glass plate and is dried overnight in air at ambient temperature ranging from about 10° C. to about 30° C.

After drying, one or more membrane disks are punched from the flat sheet membrane with a standard cutting tool for evaluation in conventional membrane test cells. The active area of the disks when placed in the test cells is 30 cm$^2$.

The membranes formed can be annealed by treating at a temperature of from about 80° C. to about 130° C. for about 15 minutes to about 60 minutes in air.

Table B illustrates conditions for forming useful membranes in accordance with this invention.

Flat membranes formed as described above have selectivity values for oxygen to nitrogen and oxygen effective permeability values as indicated below in Table C where air is used as the feed stream at a conversion of less than 10% and a relative humidity of less than 10%.

The measured selectivity values approach, in many cases, the intrinsic separation factor of ethyl cellulose for oxygen to nitrogen and indicate the integrity of the spearating layer.

Comparison of annealed and unannealed membrane data from identical membrane sheets indicates that typically a higher membrane selectivity can be achieved upon annealing with a concommittant decrease in membrane effective permeability. The fact that the preannealed membranes exhibit significant gas selectivity indicates that the membranes, as cast, are integral and do not contain small pore imperfections which, if present, would result in reduced or essentially no gas selectivity.

The oxygen effective permeability values measured on these flat membranes indicate separating layer thicknesses ranging from about 7,500 Angstroms to about 350 Angstroms as defined by the calculation method previously presented. Such thin dense separating layer thicknesses are indicative of the highly anisotropic nature of these membranes.

The oxygen concentrations achieved with these membranes can be observed to be of commercial value for inhalation therapy, combustion processes and other applications, being in the range of about 22% to about 37% oxygen.

Casting solutions for forming hollow fiber membranes comprising ethyl cellulose, multiple grades of ethyl cellulose or ethyl cellulose with nitrocellulose are formed by admixing materials as shown in the following Table D. In Table D, all percentages are by weight of the entire solution. The polymers noted in Table D are further defined in the following Table G.

At least one of the solvents in each casting solution noted in Table D is a volatile solvent with a boiling point at ambient pressure of less than 100° C. The boiling points for all noted solvents are given in Table H.

Casting solutions prepared in accordance with Table D are cast into hollow fiber membranes by pumping through a filter into a hollow fiber spinneret. Water is used as the bore fluid, and an air gap is provided between the spinneret and the surface of the coagulation bath providing an exposure time as shown in Table E below. The coagulation bath composition is water, and the bath temperature ranges from about 7° C. to about 25° C. The hollow fiber membrane is completely formed in the coagulation bath and taken up on a reel. The fiber may be further contacted with water to extract remaining trace amounts of solvents and nonsolvents. The fiber so formed is dried in air at ambient temperature ranging from about 10° C. to about 30° C.

The membranes formed can be annealed by treating at a temperature of from about 60° C. to about 130° C. for about 15 minutes to about 180 minutes in air or liquid and in the examples shown were annealed at temperatures of from about 110° C. to about 120° C. for periods of from about 45 to about 135 minutes.

After drying, multiple membrane fibers are bundled and potted at both ends in a test cartridge with suitable feed, reject and permeate manifolds. The active membrane area of the cartridges is indicated in Table F.

Table E illustrates conditions for forming useful hollow fiber membranes in accordance with this invention.

Hollow fiber membranes formed as described above have selectivity values for oxygen to nitrogen and oxygen effective permeability values as indicated below in Table F where air is used as the feed stream at a conversion (ratio of permeate stream flow rate to feed flow rate) as noted in Table F and a relative humidity of less than 10%.

The measured selectivity values approach, in most cases, the intrinsic separation factor of ethyl cellulose for oxygen to nitrogen and indicate the integrity of the separating layer.

The oxygen effective permeability values measured on these hollow fiber membranes indicate separating layer thicknesses ranging from about 1,250 Angstroms to about 600 Angstroms as defined by the calculation method previously presented. Such thin dense separating layer thicknesses are indicative of the highly anisotropic nature of these membranes.

The oxygen concentrations achieved with these membranes, even when at low conversions and at pressures ranging from 10 to 60 psig, can be observed to be of commercial value for inhalation therapy, combustion processes and other applications, being in the range of about 22% to about 40% oxygen.

The compatible nature of nitrocellulose for admixing with ethyl cellulose can be observed by the successful hollow fiber formation and performance data for membranes cast from Solutions 102 and 123. The intrinsic separation factor of nitrocellulose for oxygen to nitrogen is about 16 and thus, its addition may contribute somewhat to improved membrane gas selectivity; however, the main advantages from admixing of this compatible cellulosic polymer relate to its ability to improve solution viscosity (i.e., increase solution viscosity for spinning) and its contribution to overall fiber strength. This latter effect can be observed from comparision of the hollow fiber burst pressure data presented in Table F.

Hollow fiber membranes cast from Solution 118 as detailed in Table D and potted into a cartridge designated as 118-6C/1 Q as depicted in the above examples and detailed in Table E and F has been operated at commercially viable operating conditions for the production of oxygen-enriched air. The operating conditions were as follows:

| Feed Air Pressure (psig) | 1 |
| Feed Ride Pressure Drop (psig) | 0.1 |
| Permeate-Side Vacuum (in-Hg) | 24 |
| Temperature (C.) | 27.5 |
| Feed Flow Rate (liters/minute) | 5.35 |
| Reject Flow Rate (liters/minute) | 3.9 |
| Permeate Flow Rate (liters/minute) | 1.45 |
| Conversion (%) | 27 |
| Permeate Oxygen Concentration (%) | 35.2 |
| Permeate Nitrogen Concentration (%) | 64.8 |
| Reject Oxygen Concentration (%) | 15 |
| Reject Nitrogen Concentration (%) | 85 |

The above set of operating conditions are illustrative of the usefulness of this invention to produce oxygen enriched air as would be suitable for combustion processes, inhalation therapy, wood pulp bleaching and the like but these conditions are not to be construed as limiting the range of useful operating conditions or useful applications.

Hollow fiber membranes cast from Solution 118 as detailed in Table D and potted into a cartridge designated as 118-6C/1 Q as depicted in the above examples and detailed in Table E and F has been operated at commercially viable operating conditions for the production of nitrogen enriched air. The operating conditions were as follows:

| Feed Air Pressure (psig) | 50 |

-continued

| | |
|---|---|
| Feed Ride Pressure Drop (psig) | 0.28 |
| Temperature (C.) | 22.5 |
| Feed Flow Rate (liters/minute) | 6.8 |
| Reject Flow Rate (liters/minute) | 1.3 |
| Permeate Flow Rate (liters/minute) | 5.5 |
| Permeate Oxygen Concentration (%) | 24.7 |
| Permeate Nitrogen Concentration (%) | 75.3 |
| Reject Oxygen Concentration (%) | 4.1 |
| Reject Nitrogen Concentration (%) | 95.9 |

The above set of operating conditions are illustrative of the usefulness of this invention to produce nitrogen enriched air as would be suitable for commercial and military fuel tank blanketing in aircarft and the like and for food preservation and the like but these conditions are not to be construed as limiting the range of useful operating conditions or useful applicatons.

Hollow fiber membranes cast from Solutions 102 and 123 as detailed in Table D and potted into cartridges similar to those designated in the above examples of Table E and F have been operated on a range of individual gases to determine their permeability values for each gas and to allow calculation of selectivity values for selected pairs of gases. The resultant effective permeability and selectivity data are given in Table I.

The usefulness of this invention for gas separations such as oxygen/nitrogen, carbon dioxide/methane, carbon dioxide/nitrogen and carbon dioxide/oxygen are evident from these data and suggest commercial usage in such applications as landfill biogas methane purification, lime kiln carbon dioxide recovery, fermentor head space oxygen recovery, air revitalization carbon dioxide reduction and the like. Both the gas separations mentioned and the examples cited are meant to be illustrative of the invention and not in limitation of the invention.

It is believed that the invention may be embodied using film forming polymers other than ehyl cellulose. Among these polymers are polysulfones, polycarbonates, cellulosic polymers, polyamides, polyimides, poly(phenylene oxide) and poly(vinylidene fluoride). A specific example comprised cellulose acetate 26.9%, acetone 34.1%, formamide 35% and butanol 4% (all weight %) to form a membrane having a selectivity of 5.2 for oxygen-nitrogen separation and an oxygen permeability of $4 \times 10$ E-6. The membrane precursor was cast in water. There was an isopropyl alcohol (IPA) exchange with water followed by a hexane exchange for IPA and then air drying.

While the invention is especially useful in connection with gas separation, the invention may be used for liquid separation. Membranes according to the invention have high uniformity and integrity and are essentially free from defects.

It is evident that those skilled in the art may now make numerous modifications of and departures from the specific structures and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

TABLE A

| FLAT SHEET MEMBRANE CASTING FORMULATIONS | | | | | | | | |
|---|---|---|---|---|---|---|---|---|
| Solution # | Polymer(s) % | | Solvent(s) % | | Nonsolvent(s) % | | | |
| 01 | Std 100 | 16 | Acetone | 50.4 | Formamide | 13.5 | | |
| | | | Methanol | 20.1 | | | | |
| 02 | Std 100 | 16 | Methanol | 20.1 | Formamide | 13.5 | | |
| | | | Dioxane | 50.4 | | | | |
| 03 | Std 100 | 16 | N—Methyl 2-Pyrolidone | 25.2 | Formamide | 13.5 | Water | 0.95 |
| | | | Acetone | 25.2 | | | | |
| | | | Isopropanol | 19.2 | | | | |
| 24 | Std 20 | 18 | Isopropanol | 17.24 | Formamide | 11.5 | | |
| | | | N—Methyl 2-Pyrolidone | 53.26 | | | | |
| 26 | Std 100 | 16 | Isopropanol | 20.1 | | | | |
| | | | Acetone | 50.4 | | | | |
| 26X | Std 100 | 15.85 | Acetone | 49.91 | Formamide | 13.34 | Water | 1.0 |
| | | | Isopropanol | 19.9 | | | | |
| 28 | Std 100 | 16 | Isopropanol | 20.1 | Formamide | 13.5 | | |
| | | | Methyl Acetate | 50.4 | | | | |
| 30 | | | Methanol | 17.6 | | | | |
| | Med 50 | 14 | Dioxane | 56.6 | Formamide | 11.8 | | |
| 31 | NC 125-175 | 3.93 | Methanol | 20.12 | | | | |
| | Std 100 | 12.01 | Acetone | 50.43 | Formamide | 13.51 | | |
| 31X | NC 125-175 | 8 | Methanol | 19.3 | | | | |
| | Std 100 | 11.5 | Acetone | 48.3 | Formamide | 12.9 | | |
| 32X | Std 100 | 20 | Ethanol | 67.2 | Formamide | 12.8 | | |
| 32Y | Std 100 | 19.61 | Ethanol | 65.85 | Formamide | 12.54 | Water | 2.0 |
| 33 | Std 100 | 16 | Acetone | 70.5 | Formamide | 13.5 | | |
| 33X | Std 100 | 20 | Acetone | 67.1, | Formamide | 12.9 | | |
| 36Y | | | Isopropanol | 17.62 | | | | |
| | T-50 | 14 | Dioxane | 56.62 | Formamide | 11.76 | | |
| 40Y | Std 100 | 16 | Acetone | 68 | Formamide | 14 | Water | 2 |
| 40Z | Std 100 | 15.68 | Acetone | 66.62 | Formamide | 13.7 | Water | 4 |
| 42X | NC 125-175 | 4 | | | | | | |
| | Std 100 | 12 | Acetone | 66.9 | Formamide | 15.4 | Water | 1.7 |
| 48 | Std 20 | 10.15 | | | | | | |
| | Std 100 | 10.15 | Acetone | 66 | Formamide | 13.7 | | |
| 48Y | Std 20 | 8.84 | Acetone | 67.11 | Formamide | 13.1 | Water | 2 |
| | Std 100 | 8.84 | | | | | | |
| | | | Acetone | 23.19 | | | | |
| 51Y | Std 45 | 16.69 | Dioxane | 48.23 | Formamide | 10 | Water | 1.89 |
| 52 | Std 100 | 18 | Acetone | 62 | Formamide | 20 | | |

TABLE A-continued

FLAT SHEET MEMBRANE CASTING FORMULATIONS

| Solution # | Polymer(s) | % | Solvent(s) | % | Nonsolvent(s) | % | | |
|---|---|---|---|---|---|---|---|---|
| 58X | Std 20 | 9.8 | Acetone | 65.17 | Formamide | 13.23 | Water | 2.0 |
|  | Std 100 | 9.8 |  |  |  |  |  |  |
| 59 | Std 20 | 10 | Acetone | 60.49 | Formamide | 19.51 |  |  |
|  | Std 100 | 10 |  |  |  |  |  |  |
| 66 | Std 45 | 21.8 | Acetone | 22.36 | Formamide | 9.42 | Water | 1.88 |
|  |  |  | Dioxane | 44.54 |  |  |  |  |
| 90 | Std 100 | 22 | Ethanol | 55.4 | Formamide | 20.5 | Water | 2.1 |
| 91 | Std 100 | 24.49 | Ethanol | 62.76 | Formamide | 12.75 |  |  |
| 129 | NC 125-175 | 6 | Acetone | 5 | Formamide | 13 | Water | 2 |
|  | Std 100 | 20 | Ethanol | 49 | Butanol | 5 |  |  |
| 214 | Std 100 | 20.4 | Ethanol | 59.2 | Formamide | 14.3 |  |  |
|  | T-200 | 6.1 |  |  |  |  |  |  |
| 215 | Std 100 | 14.3 | Ethanol | 58.1 | Formamide | 14.3 |  |  |
|  | T-200 | 13.3 |  |  |  |  |  |  |

Note: See Table G for further description of polymers.

TABLE B

FLAT SHEET MEMBRANE CASTING CONDITIONS

| Solution/Membrane # | Gelation Bath Temperature, C. | Air Exposure Time, Seconds | Annealing Conditions Temp., C. | Time, Min. |
|---|---|---|---|---|
| 01-09A | 25 | 30 | — | — |
| 01-09B A | 25 | 30 | 91 | 15 |
| 02-08A | 25 | 60 | 82 | 15 |
| 03-08 A | 20 | 60 | 87 | 15 |
| 24-01A | 20.5 | 60 | — | — |
| 26-02A A | 22 | 60 | ~90 | ~15 |
| 26X-01A | 22.5 | 60 | — | — |
| 28-02B | 22.5 | 30 | — | — |
| 30-01A | 21.5 | 60 | — | — |
| 31-01A | 21 | 30 | — | — |
| 31-01A A | 21 | 30 | 87 | 30 |
| 31-01B | 21 | 30 | — | — |
| 31-01B A | 21 | 30 | 89 | 50 |
| 31X-01A | 21.5 | 60 | — | — |
| 31X-02A | 21 | 15 | — | — |
| 31X-01A A | 21 | 60 | 93 | 15 |
| 32Y-01A | 22 | 6 | — | — |
| 33-01A | 22.5 | 60 | — | — |
| 33-01A A | 22.5 | 60 | 88 | 15 |
| 33-01B | 22.5 | 60 | — | — |
| 33-01B A | 22.5 | 60 | 88 | 15 |
| 33X-02A | 21 | 6 | — | — |
| 36Y-02B A | 20 | 60 | 141 | 60 |
| 40Y-01A | 20.5 | 60 | — | — |
| 40Y-01A A | 20.5 | 60 | 87 | 30 |
| 40Z-01A 2A | 22 | 30 | 116 | 60 |
| 42X-01A | 22 | 60 | 129 | 60 |
| 48-01A | 21 | 60 | — | — |
| 48Y-01A | 22 | 6 | — | — |
| 48Y-01B 2A | 22 | 6 | 116 | 30 |
| 51Y-01A | 21 | 30 | — | — |
| 51Y-01A A | 21 | 30 | 89 | 15 |
| 52-01A A | 23 | 6 | 104 | 30 |
| 58X-01A | 23 | 6 | — | — |
| 58X-02A A | 23 | 6 | 100 | 17 |
| 59-03A | 22.5 | 15 | — | — |
| 59-03A A | 22.5 | 15 | 91 | 15 |
| 66-01B A | 24 | 6 | 90 | 15 |
| 90-01A | 22.5 | 6 | — | — |
| 90-01A A | 22.5 | 6 | 90 | 15 |
| 91-01A | 23 | 6 | — | — |
| 129-01A | 17 | 6 | — | — |
| 214-01A | 17 | 6 | — | — |
| 215-01A | 21 | 6 | — | — |
| 214-01A A | 17 | 6 | 37/66 | 120 min./60 min. |
| 215-01A A | 21 | 6 | 37/66 | 120 min./60 min. |

Note: Gelation bath is water in all cases.

TABLE C
FLAT SHEET MEMBRANE PERFORMANCE DATA

| Solution/ Membrane # | Feed Air Pressure, Psig | Permeate Flow, cc/min. | Permeate Oxygen Concentration, % | Oxygen Effective Permeability $cm^3(STP)/cm^2$-sec Cm-Hg $\times 10^4$ | Oxygen/Nitrogen Selectivity |
|---|---|---|---|---|---|
| 01-09A | 50 | 6 | 34.1 | 0.36 | 2.65 |
| 01-09B A | 30 | 4 | 32.1 | 0.44 | 2.76 |
| 02-08A A | 30 | 4.8 | 31.5 | 0.5 | 2.62 |
| 03-08 A | 30 | 15 | 28.5 | 1.06 | 2.08 |
| 24-01A | 30 | 5.8 | 30.4 | 0.47 | 2.34 |
| 26-02A A | 20 | 12 | 28.2 | 1.41 | 2.33 |
| 26X-01A | 20 | 6 | 28.18 | 0.74 | 2.20 |
| 28-2B | 20 | 0.2 | 23.49 | 0.12 | 1.31 |
| 30-01A | 20 | 5 | 26.74 | 0.60 | 1.88 |
| 31-01A | 10 | 2.1 | 25.95 | 0.74 | 2.3 |
| 31-01A A | 20 | 4 | 30.67 | 0.67 | 2.9 |
| 31-01B | 20 | 18 | 25.84 | 1.67 | 1.82 |
| 31-01B A | 20 | 4 | 30.15 | 0.66 | 2.73 |
| 31X-01A | 40 | 4.5 | 32.59 | 0.33 | 2.51 |
| 31X-02A | 20 | 4 | 28.49 | 0.54 | 2.26 |
| 32X-01A A | 20 | 17 | 22.5 | 1.15 | 1.21 |
| 32Y-01A | 10 | 4 | 26.35 | 1.22 | 2.49 |
| 33-01A | 40 | 14 | 32.79 | 0.98 | 2.73 |
| 33-01A A | 30 | 8.5 | 33.3 | 0.84 | 3.16 |
| 33-01B | 10 | 12.5 | 24.19 | 2.38 | 1.75 |
| 33-01B A | 60 | 26 | 37.05 | 1.11 | 2.94 |
| 33X-02A | 30 | 20 | 27.61 | 1.30 | 1.95 |
| 36Y-02B A | 20 | 1.1 | 27.24 | 0.24 | 1.94 |
| 40Y-01A | 20 | 6 | 29.37 | 0.89 | 2.53 |
| 40Y-01A A | 20 | 3.2 | 30.30 | 0.62 | 2.74 |
| 40Z-01A 2A | 30 | 8.4 | 30.02 | 0.67 | 2.29 |
| 42X-01A A | 40 | 15 | 31.67 | 0.88 | 2.49 |
| 48-01A | 50 | 4.2 | 29.96 | 0.20 | 1.97 |
| 48Y-01A | 20 | 34 | 24.50 | 2.73 | 1.57 |
| 48Y-01B 2A | 20 | 5.2 | 30.56 | 0.86 | 2.87 |
| 51Y-01A | 20 | 68 | 22.4 | 4.47 | 1.25 |
| 51Y-01A A | 30 | 19 | 31.93 | 1.83 | 3.24 |
| 52-01A A | 20 | 14 | 26.10 | 1.34 | 1.81 |
| 58X-01A | 20 | 7.5 | 29.1 | 0.88 | 2.48 |
| 58X-01A A | 20 | 1.5 | 31.01 | 0.23 | 2.91 |
| 59-03A | 20 | 6.2 | 29.18 | 0.76 | 2.46 |
| 59-03A A | 20 | 2.58 | 31.1 | 0.39 | 2.98 |
| 66-01B A | 20 | 3.5 | 29.32 | 0.49 | 2.46 |
| 90-01A | 10 | 4.8 | 25.75 | 1.10 | 2.28 |
| 90-01A A | 20 | 5.73 | 30.21 | 0.75 | 2.69 |
| 91-01A | 10 | 11 | 25.95 | 2.52 | 2.41 |
| 129-01A | 50.5 | 4.5 | 35.6 | 0.22 | 3.1 |
| 214-01A | 50 | 66 | 34.8 | 2.45 | 2.78 |
| 214-01A A | 50 | 44 | 36.87 | 2.19 | 3.14 |
| 215-01A | 50 | 46 | 36.8 | 2.28 | 3.03 |
| 215-01A A | 50 | 37 | 37.78 | 1.9 | 3.23 |

TABLE D
HOLLOW FIBER MEMBRANE CASTING FORMULATIONS

| Sol. #(s) | Polymer(s), % | | Solvent(s), % | | Nonsolvent(s), % | |
|---|---|---|---|---|---|---|
| 71,74, 89,93 | Std 100 | 24 | Ethanol | 61.5 | Water Formamide | 2 12.5 |
| 102 | NC 125-175 Std 100 | 12 12 | Methanol Acetone | 20 43 | Water Formamide | 2 13 |
| 108 | Std 100 | 24 | Acetone Ethanol | 20.3 40.7 | Water Formamide | 2 13 |
| 115,118 | Std 100 | 26.5 | Butanol | 4.0 | Water | 2 |
| 123 | NC 125-175 Std 100 | 6 20 | Ethanol Acetone Ethanol Butanol | 55.5 20 34 5 | Formamide Formamide Water | 13 13 2 |

Sol.— Solution
Note: See Table G further description of polymers.

TABLE E
HOLLOW FIBER MEMBRANE CASTING CONDITIONS

| Solution/ Membrane # | Air Exposure Time, Seconds | Coagulation Bath Temperature, C. | Hollow Fiber Dimensions | | Annealing Conditions | |
|---|---|---|---|---|---|---|
| | | | ID, mm | OD, mm | Temp., °C. | Time, Min. |
| 71-01/3 | 4.7 | 25 | 0.78 | 0.96 | — | — |
| 74-2A/9 | 2.6 | 25 | 0.48 | 0.92 | — | — |
| 74-3B/2A | 0.36 | 25 | 0.51 | 0.9 | 110 | 45 |
| 89-03A/1 | 0.96 | 19.5 | 0.42 | 0.61 | — | — |
| 89-04B/1 | 1.9 | 19.5 | 0.42 | 0.59 | — | — |
| 89-05B/1 | 0.45 | 19.5 | 0.39 | 0.56 | — | — |
| 93-01B/1 | 0.2 | 20 | 0.28 | 0.37 | — | — |
| 93-02A/1 | 0.27 | 20 | 0.26 | 0.35 | — | — |
| 93-03A/1 | 0.56 | 20 | 0.27 | 0.38 | — | — |

TABLE E-continued

HOLLOW FIBER MEMBRANE CASTING CONDITIONS

| Solution/ Membrane # | Air Exposure Time, Seconds | Coagulation Bath Temperature, C. | Hollow Fiber Dimensions ID, mm | Hollow Fiber Dimensions OD, mm | Annealing Conditions Temp., °C. | Annealing Conditions Time, Min. |
|---|---|---|---|---|---|---|
| 93-04A/2A | 0.14 | 20 | 0.25 | 0.38 | 118 | 135 |
| 93-06/1 | 0.8 | 20 | 0.26 | 0.34 | — | — |
| 102-04B/1 | 1.25 | 20 | 0.36 | 0.45 | — | — |
| 102-07/1 | 0.03 | 20 | 0.35 | 0.47 | — | — |
| 108-01/2 | 1.35 | 22 | 0.43 | 0.55 | — | — |
| 108-08/2 | 0.56 | 22 | 0.29 | 0.52 | — | — |
| 115-04A/1 Q | 1.03 | 15.5 | 0.41 | 0.53 | — | — |
| 118-06C/1 | 1.27 | 16.5 | 0.37 | 0.49 | — | — |
| 123-02B/1 | 0.2 | 17 | 0.55 | 0.73 | — | — |
| 123-05/1 | 0.076 | 8.5 | 0.46 | 0.53 | — | — |

Temp.— Temperature
Note:
1. Coagulation bath is water in all cases.
2. Bore fluid is water in all cases.

TABLE F

HOLLOW FIBER MEMBRANE PERFORMANCE DATA

| Sol./ Mem. # | Cart. Area Cm$^2$ | Feed Air Pres., Psig | Temp., °C. | Conv. % | Permeate Flow, cc/min. | Reject Flow, cc/min. | Feed Flow cc/ min. | Permeate O$_2$ Con. % | Reject O$_2$ Con. % | Oxygen Eff. Perm. cm$^3$(STP) cm$^2$-sec cm-Hg × 10$^4$ | Oxygen/ Nitrogen Selc. | Tensile/ Str. psi/in$^2$ |
|---|---|---|---|---|---|---|---|---|---|---|---|---|
| 71-01/3 | 23 | 40 | 22.2 | 33.5 | 46 | 90 | 13 | 26.7 | NA | 2.54 | 1.82 | — |
| 74-2A/9 | 43 | 20 | 22.2 | 1.2 | 12 | 1,020 | 1,030 | 32.4 | NA | 1.29 | 3.41 | 1,056 |
| 74-3B/2A | 25 | 10 | 26 | 2.4 | 4.9 | 199 | 204 | 27.0 | NA | 1.40 | 2.78 | — |
| 89-03A/1 | 50 | 10 | 23.3 | 6.5 | 5.3 | 76 | 81 | 27.0 | NA | 0.82 | 2.9 | — |
| 89-04B/1 | 50 | 10 | 22.2 | 7.6 | 7.1 | 87 | 94 | 27.5 | 20.9 | 0.82 | 3.2 | — |
| 89-05B/1 | 55 | 20 | 21.2 | 2.8 | 23 | 800 | 823 | 31.7 | 20.6 | 1.7 | 3.2 | — |
| 93-01B/1 | 49 | 20 | 21.2 | 2.9 | 24 | 800 | 823 | 31.9 | 20.6 | 2.0 | 3.3 | — |
| 93-02A/1 | 48 | 20 | 18.3 | 2.7 | 28 | 984 | 1,010 | 31.8 | 20.6 | 2.4 | 3.2 | — |
| 93-03A/1 | 50 | 50 | 21.2 | 1.2 | 37 | 3,000 | 3,040 | 39.0 | 20.8 | 1.44 | 3.44 | — |
| 93-04A/2A | 41 | 30 | 21.1 | 0.9 | 29 | 3,000 | 3,030 | 31.1 | 20.8 | 1.51 | 2.40 | — |
| 93-06/1 | 50 | 30 | 22.2 | 3.0 | 33 | 1,070 | 1,100 | 35.1 | 20.59 | 1.85 | 3.43 | 850 |
| 102-04B/1 | 143 | 50 | 19.7 | 0.4 | 11 | 2,860 | 2,870 | 40.5 | 20.9 | 0.12 | 3.8 | — |
| 102-07/1 | 161 | 50 | 19.5 | 2.6 | 66 | 2,500 | 2,565 | 37.2 | 20.5 | 0.62 | 3.15 | — |
| 108-01/2 | 64 | 20 | 20 | 7.9 | 17 | 197 | 214 | 32.6 | 20.3 | 1.19 | 3.6 | 802 |
| 108-08/2 | 44 | 50 | 18.9 | 2.0 | 28 | 1,364 | 1,390 | 38.9 | 20.7 | 1.06 | 3.49 | 540 |
| 115-04A/1 Q | 1,353 | 20 | 19.3 | 11.1 | 690 | 5,500 | 6,200 | 31.2 | 19.1 | 2.20 | 3.43 | — |
| 118-06C/1 | 4,229 | 20 | 18.5 | 16.5 | 2575 | 13,000 | 15,575 | 31.3 | 19.1 | 2.65 | 3.4 | — |
| 123-02B/1 | 155 | 50 | 18.1 | 1.6 | 116 | 7,060 | 7,175 | 39.4 | 20.7 | 1.25 | 3.6 | >1,215 |
| 123-05/1 | 124.5 | 50 | 18.6 | 1.1 | 96 | 8,330 | 8,430 | 39.8 | 20.7 | 1.33 | 3.7 | >2,270 |

Sol.— Solution
Cart.— Cartridge
Pres.— Pressure
Temp.— Temperature
Conv.— Conversion
Con.— Concentration
Eff.— Effective
Perm.— Permeability
Str.— Strength
Selc.— Selectivity
NA— Not Available
Mem— Membrane
Note: Oxygen effective permeability and oxygen to nitrogen selectivity data calculated from mass balance equations based at theoretical conversion (0%).

TABLE G

LISTING OF KNOWN AVAILABLE ETHYL CELLULOSE POLYMERS

| Trade Name | | | Manufacturer | Ethoxyl Content, % | Viscosity Range, Cp |
|---|---|---|---|---|---|
| Ethocel | Medium | 50 | Dow Chemical Co. | 45.0 to 46.5 | 45 to 55 |
| Ethocel | Medium | 70 | Dow Chemical Co. | 45.0 to 46.5 | 63 to 85 |
| Ethocel | Medium | 100 | Dow Chemical Co. | 45.5 to 47.0 | 90 to 110 |
| Ethocel | Standard | 4 | Dow Chemical Co. | 48.0 to 49.5 | 3 to 5.5 |
| Ethocel | Standard | 7 | Dow Chemical Co. | 48.0 to 49.5 | 6 to 8 |
| Ethocel | Standard | 10 | Dow Chemical Co. | 48.0 to 49.5 | 9 to 11 |
| Ethocel | Standard | 20 | Dow Chemical Co. | 48.0 to 49.5 | 18 to 22 |
| Ethocel | Standard | 45 | Dow Chemical Co. | 48.0 to 49.5 | 41 to 49 |
| Ethocel | Standard | 100 | Dow Chemical Co. | 48.0 to 49.5 | 90 to 110 |
| Ethocel | HE | 10 | Dow Chemical Co. | 49.5 to 52.0 | 9 to 11 |
| K-14 | | | Hercules, Inc. | 45.5 to 46.8 | 12 to 16 |
| K-50 | | | Hercules, Inc. | 45.5 to 46.8 | 40 to 52 |
| K-100 | | | Hercules, Inc. | 45.5 to 46.8 | 80 to 105 |
| K-200 | | | Hercules, Inc. | 45.5 to 46.8 | 150 to 250 |

TABLE G-continued
LISTING OF KNOWN AVAILABLE ETHYL CELLULOSE POLYMERS

| Trade Name | Manufacturer | Ethoxyl Content, % | Viscosity Range, Cp |
|---|---|---|---|
| K-5000 | Hercules, Inc. | 45.5 to 46.8 | |
| N-4 | Hercules, Inc. | 47.5 to 49.0 | 3 to 5.5 |
| N-7 | Hercules, Inc. | 47.5 to 49.0 | 6 to 8 |
| N-10 | Hercules, Inc. | 47.5 to 49.0 | 8 to 11 |
| N-14 | Hercules, Inc. | 47.5 to 49.0 | 12 to 16 |
| N-22 | Hercules, Inc. | 47.5 to 49.0 | 18 to 24 |
| N-50 | Hercules, Inc. | 47.5 to 49.0 | 40 to 52 |
| N-100 | Hercules, Inc. | 47.5 to 49.0 | 80 to 105 |
| N-200 | Hercules, Inc. | 47.5 to 49.0 | 150 to 250 |
| N-300 | Hercules, Inc. | 47.5 to 49.0 | 250 to 350 |
| T-10 | Hercules, Inc. | 49.0 + | 8 to 11 |
| T-50 | Hercules, Inc. | 49.0 + | 40 to 52 |
| T-100 | Hercules, Inc. | 49.0 + | 80 to 105 |
| T-200 | Hercules, Inc. | 49.0 + | 150 to 250 |

Note:
1. Information from company literature.
2. Viscosities for Ethocel products are for 5% solutions measured at 25° C. in an Ubbelohde viscometer. For "medium" grades, solvent is 60% toluene and 40% ethanol. For all other Ethocel grades, solvent is 80% toluene and 20% ethanol.
3. Viscosities for Hercules products are for 5% solutions measured at 25° C. with solvent of 80:20 toluene:ethanol. Ethyl cellulose sample dried 30 minutes at 100° C.

TABLE H
BOILING POINTS OF SOME SOLVENTS USEFUL FOR THIS INVENTION AS THE VOLATILE SOLVENT

| Solvent | Boiling Point, °C. |
|---|---|
| Acetone | 56 |
| Ethanol | 75 |
| Isopropanol | 82 |
| Methanol | 65 |
| Methyl Acetate | 57 |

Note: Boiling point at standard atmospheric pressure.

TABLE I
EFFECTIVE PERMEABILITY AND SELECTIVITY DATA FOR SELECTED GASES ON MEMBRANES PREPARED THROUGH THE TEACHINGS OF THIS INVENTION

| | Individual Gas Effective Permeability ($cm^3$(STP)/$cm^2$ sec·cm-Hg $\times 10^4$) | | Selectivity | |
|---|---|---|---|---|
| Individual Gas or Pair of Gases | 102-6/1 | 123-5/1 | 102-6/1 | 123-5/1 |
| Nitrogen | 0.22 | 0.39 | | |
| Methane | 0.20 | 0.60 | | |
| Oxygen | 0.68 | 1.38 | | |
| Carbon Dioxide | 2.60 | 5.31 | | |
| Oxygen/Nitrogen | | | 3.1 | 3.5 |
| Carbon Dioxide/Methane | | | 13.0 | 8.9 |
| Carbon Dioxide/Nitrogen | | | 11.8 | 13.6 |
| Carbon Dioxide/Oxygen | | | 3.8 | 3.8 |
| Nitrogen/Methane | | | 1.1 | 0.7 |

What is claimed is:

1. A method of making anisotropic membranes for gas separation which method includes the steps of,
   forming a casting solution having a base polymer of ethyl cellulose with at least substantially 2.2 ethoxyl groups per anhydroglucose unit and a nonsolvent compatible with said base polymer in a solvent system including at least one solvent having relatively high volatility with a low boiling point below 100° C.,
   casting a membrane precursor with said casting solution,
   exposing said cast membrane precursor to air for a short time interval significantly less than a minute to cause sufficient solvent loss to form an integral skin layer,
   and then immersing the cast membrane precursor into a leaching agent that dissolves said nonsolvent but not said base polymer sufficiently long to dissolve said nonsolvent and form an anisotropic membrane with pores and an integral, essentially imperfection-free separating skin layer comprising said ethyl cellulose,
   and then drying said membrane.

2. A method in accordance with claim 1 wherein said casting solution contains about 10% to 35% by weight of polymer.

3. A method in accordance with claim 2 wherein said casting solution contains about 14% to 25% by weight of polymer.

4. A method in accordance with claim 2 wherein said base polymer has an ethoxyl content of at least 45%.

5. A method in accordance with claim 4 wherein said base polymer has an ethoxyl content within the range of 4.75-52%.

6. A method in accordance with claim 4 wherein said nonsolvent is 10% to about 50% by weight of said casting solution.

7. A method in accordance with claim 2 wherein the degree of substitution of ethoxyl for the hydroxyl groups of said ethyl cellulose polymeric material is at least 2.25.

8. A method in accordance with claim 7 wherein said degree of substitution is within the range of 2.42 to 3.0.

9. A method in accordance with claim 1 and further including the steps of spinning said casting solution to form a hollow filament having a bore,
   injecting a fluid into said bore,
   exposing the outside of the fiber to an environment that induces solvent evaporation and formation of the integral gas separating thin layer for a time interval within the range just above zero to about 10 seconds,
   immersing the fiber in a coagulating medium for a time at least sufficient to insure solidification of the filament,
   and then drying the filament.

10. A method in accordance with claim 1 wherein said casting solution includes nitrocellulose.

11. A method in accordance with claim 1 wherein the at least one solvent of relatively high volatility is a solvent from the group consisting of isopropanol, methyl acetate, methanol, ethanol, and acetone.

12. A method in accordance with claim 11 wherein the nonsolvent in said casting solutin is from the group consisting of water and formamide.

13. A method in accordance with claim 1 wherein the nonsolvent in said casting solution is from the group consisting of water and formamide.

14. An anisotropic membrane with pores and an integral essentially imperfection-free separating skin layer for gas separation comprising ethyl cellulose made in accordance with the method of claim 1.

15. A membrane and made in accordance with the method of claim 1 formed from a casting solution comprising ethyl cellulose with a porous substrate coated with an anisotropic porous membrane of thickness significantly less than that of said porous substrate.

16. A membrane in accordance with claim 15 wherein said coating is formed of an anisotropic ethyl cellulose-based membrane.

17. A membrane in accordance with claim 16 wherein the thickness of said anisotropic membrane coating is less than of the order of 10,000 Angstroms and that of said porous substrate is within the range of substantially 10–400 microns.

18. A membrane in accordance with claim 15 wherein the thickness of said anisotropic membrane coating is less than of the order of 10,000 Angstroms and that of said porous substrate is within the range of substantially 10–400 microns.

19. A dense ethyl cellulose membrane and made in accordance with the method of claim 1 formed from a casting solution having an ethyoxyl content of at least 47.5%.

20. A dense ethyl cellulose membrane in accordance with claim 19 having a porous substrate formed with a coating of thickness significantly less than that of said substrate.

21. A dense ethyl cellulose membrane in accordance with claim 19 wherein said dense ethyl cellulose membrane is a thin coating.

22. A dense ethyl cellulose membrane in accordance with claim 21 wherein the thickness of said thin coating is less than of the order of 10,000 Angstroms.

23. A dense ethyl cellulose membrane in accordance with claim 19 wherein said dense ethyl cellulose membrane is a substrate.

24. A dense ethyl cellulose membrane in accordance with claim 23 wherein the thickness of said substrate is within the range of substantially 10–400 microns.

25. A dense ethyl cellulose membrane in accordance with claim 19 wherein said dense ethyl cellulose membrane is a self-standing sheet.

26. A dense ethyl cellulose membrane in accordance with claim 19 wherein said dense ethyl cellulose membrane is a hollow fiber.

27. A method in accordance with claim 1 wherein said casting solution includes a second polymer compatible with said base polymer in said casting solution.

* * * * *

UNITED STATES PATENT OFFICE
CERTIFICATE OF CORRECTION

Patent No. 4,681,605          Dated July 21, 1987

Inventor(s) Arye Z. Gollan

It is certified that error appears in the above-identified patent and that said Letters Patent are hereby corrected as shown below:

Column 3, line 39, spell "permeability" correctly.

Column 5, line 54, spell "separating" correctly.

Column 11, line 2, spell "separating" correctly.

Column 12, line 42, spell "Feed-Side" correctly.

Column 13, line 2, spell "Feed-Side" correctly.

Column 13, line 33, after "revitalization" insert --,--.

Column 14, line 6, spell "ethyl" correctly.

Column 22, line 40, "4.75" should read --47.5--.

Column 23, line 2, spell "solution" correctly.

Signed and Sealed this

Twenty-fourth Day of November, 1987

*Attest:*

DONALD J. QUIGG

*Attesting Officer*      *Commissioner of Patents and Trademarks*